(12) United States Patent
Kawanaka et al.

(10) Patent No.: US 12,459,038 B2
(45) Date of Patent: Nov. 4, 2025

(54) ADDITIVE MANUFACTURING METHOD

(71) Applicant: HITACHI, LTD., Tokyo (JP)

(72) Inventors: Hirotsugu Kawanaka, Tokyo (JP); Noboru Saito, Tokyo (JP); Shinji Matsushita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 432 days.

(21) Appl. No.: 18/013,301

(22) PCT Filed: Mar. 8, 2021

(86) PCT No.: PCT/JP2021/009091
§ 371 (c)(1),
(2) Date: Dec. 28, 2022

(87) PCT Pub. No.: WO2022/030042
PCT Pub. Date: Feb. 10, 2022

(65) Prior Publication Data
US 2023/0321728 A1     Oct. 12, 2023

(30) Foreign Application Priority Data

Aug. 3, 2020   (JP) ................................. 2020-131646

(51) Int. Cl.
*B22F 10/32*       (2021.01)
*B22F 10/28*       (2021.01)
(Continued)

(52) U.S. Cl.
CPC .............. *B22F 10/32* (2021.01); *B22F 10/28* (2021.01); *B22F 12/17* (2021.01); *B22F 12/30* (2021.01);
(Continued)

(58) Field of Classification Search
CPC .......... B22F 10/32; B22F 12/17; B22F 12/30; B22F 10/28; B22F 2201/11; B33Y 10/00;
(Continued)

(56) References Cited

U.S. PATENT DOCUMENTS

| | | | |
|---|---|---|---|
| 2012/0126457 A1* | 5/2012 | Abe | ........................ B33Y 30/00 264/460 |
| 2017/0165748 A1 | 6/2017 | Kamachi et al. | |
| 2019/0232429 A1* | 8/2019 | Buller | ................. B23K 26/1438 |

FOREIGN PATENT DOCUMENTS

| | | |
|---|---|---|
| JP | 2010265521 A | 11/2010 |
| JP | 2015189618 A | 11/2015 |

(Continued)

OTHER PUBLICATIONS

International Search Report of PCT/JP2021/009091 dated May 18, 2021.

*Primary Examiner* — Ricardo D Morales
(74) *Attorney, Agent, or Firm* — MATTINGLY & MALUR, PC

(57) ABSTRACT

The present disclosure provides an additive manufacturing method by which a uniform powder bed can be formed even when the interior of a chamber is depressurized and a powder bed is formed on a stage as the stage is preheated and an inert gas is supplied. An additive manufacturing method for a shaped object S includes forming a powder bed PB on a stage 51 in a chamber 10, and fusing the powder bed PB by laser emission. According to this additive manufacturing method, a pressure in the chamber 10 is reduced to a pressure equal to or higher than 8000 [Pa] and equal to or lower than 30,000 [Pa], and the powder bed PB is formed on the stage 51 as the stage 51 is preheated and an inert gas is supplied.

7 Claims, 11 Drawing Sheets

(51) Int. Cl.
　　　*B22F 12/17*　　　(2021.01)
　　　*B22F 12/30*　　　(2021.01)
　　　*B29C 64/153*　　(2017.01)
　　　*B29C 64/245*　　(2017.01)
　　　*B29C 64/295*　　(2017.01)
　　　*B29C 64/371*　　(2017.01)
　　　*B33Y 10/00*　　 (2015.01)

(52) U.S. Cl.
　　　CPC .......... *B29C 64/153* (2017.08); *B29C 64/245* (2017.08); *B29C 64/295* (2017.08); *B29C 64/371* (2017.08); *B33Y 10/00* (2014.12); *B22F 2201/11* (2013.01)

(58) Field of Classification Search
　　　CPC ... B29C 64/153; B29C 64/245; B29C 64/295; B29C 64/371
　　　See application file for complete search history.

(56) References Cited

FOREIGN PATENT DOCUMENTS

| | | |
|---|---|---|
| JP | 2017105075 A | 6/2017 |
| JP | 2017109357 A | 6/2017 |
| JP | 2017110261 A | 6/2017 |
| JP | 2017145476 A | 8/2017 |
| JP | 2019142024 A | 8/2019 |

\* cited by examiner

PB

PB

ADDITIVE MANUFACTURING METHOD

TECHNICAL FIELD

The present disclosure relates to an additive manufacturing method.

BACKGROUND ART

An invention related to a manufacturing method for single crystal has been known for years (see PTL 1 below). The manufacturing method for single crystal described in PTL 1 includes a preparation step of preparing a seed crystal, and a growth step of supplying an inorganic material onto the seed crystal, using an additive manufacturing technique, and fusing the inorganic material by heat energy to cause a single crystal to grow on the seed crystal.

An invention related to a manufacturing method for a structure containing an intermetallic compound is also known (see PTL 2 below). This conventional manufacturing method for the structure includes: a mixed layer forming step of fusing together powder particles, which are supplied onto a metal base and serve as a starting material of the structure, and a surface layer of the metal base to form a mixed layer, and a shaping step of supplying the powder particles onto the mixed layer and fusing the powder particles to form the structure.

These conventional manufacturing methods include a step of supplying an inert gas, such as an argon gas or nitrogen gas, into a chamber after the chamber is vacuumized and preheating the base placed on a shaping table. In this step, the base may be preheated without supplying the inert gas into the chamber after it is vaccumized, or the base may be preheated after the inert gas is supplied into the chamber that is not vaccumized (see paragraph [0044] of PTL 1 and paragraph [0047] of PTL 2).

The above conventional manufacturing methods further include a step of forming a powder bed after preheating the base. In this step, a piston in a powder supply chamber is moved up to move a recoater, which discharges the powder particles, and the discharged powder particles are supplied to a bed forming chamber and are deposited on the base and the shaping table to form an inorganic layer and a powder bed (see paragraph [0046] of PTL 1 and paragraph [0048] of PTL 2).

CITATION LIST

Patent Literature

PTL 1: JP 2015-189618 A
PTL 2: JP 2017-109357 A

SUMMARY OF INVENTION

Technical Problem

The inventors of the present invention have found that the process of depressurizing the interior of the chamber and forming the powder bed on the base while preheating the base and supplying the inert gas, the process being carried out as the conventional manufacturing method, may lead to a case where the powder bed cannot be formed or a case where the powder bed turns out to be irregular one. The present disclosure provides an additive manufacturing method by which a uniform powder bed can be formed even when the interior of a chamber is depressurized and a powder bed is formed on a stage as the stage is preheated and an inert gas is supplied.

Solution to Problem

One aspect of the present disclosure is an additive manufacturing method of forming a powder bed on a stage in a chamber and emitting a laser beam onto the powder bed to manufacture a shaped object by fusion. The additive manufacturing method includes: reducing a pressure inside the chamber to a pressure equal to or higher than 8000 [Pa] and equal to or lower than 30,000 [Pa]; and forming the powder bed on the stage while preheating the stage and supplying an inert gas.

Advantageous Effects of Invention

According to the above one aspect of the present disclosure, an additive manufacturing method can be provided by which a uniform powder bed can be formed even when the interior of a chamber is depressurized and a powder bed is formed on a stage as the stage is preheated and an inert gas is supplied.

DESCRIPTION OF EMBODIMENTS

Embodiments of an additive manufacturing method according to the present disclosure will hereinafter be described with reference to the drawings.

Additive manufacturing is a process of creating an object from a numerical representation of a three-dimensional shape by adding/bonding materials to each other. The additive manufacturing is the opposite of manufacturing involving removal processes/machining. Additive manufacturing is referred to also as "3D printing" or "lamination shaping", and often involves stacking a plurality of layers into a laminate.

Figure 1:
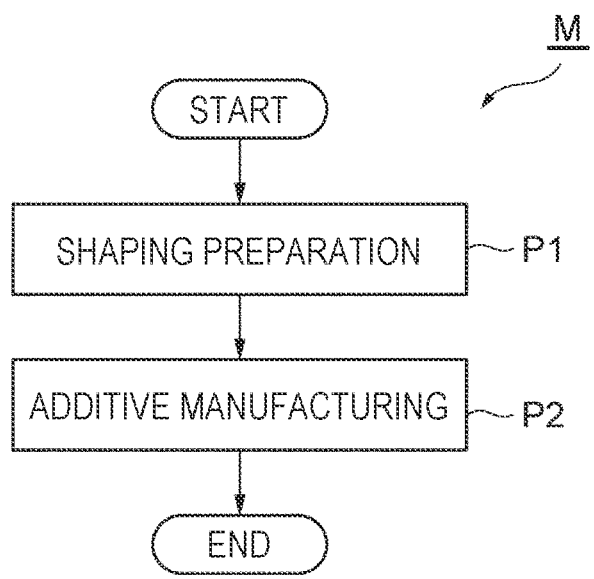
FIG. 1 is a flowchart showing an embodiment of an additive manufacturing method of the present disclosure.
Figure 2:
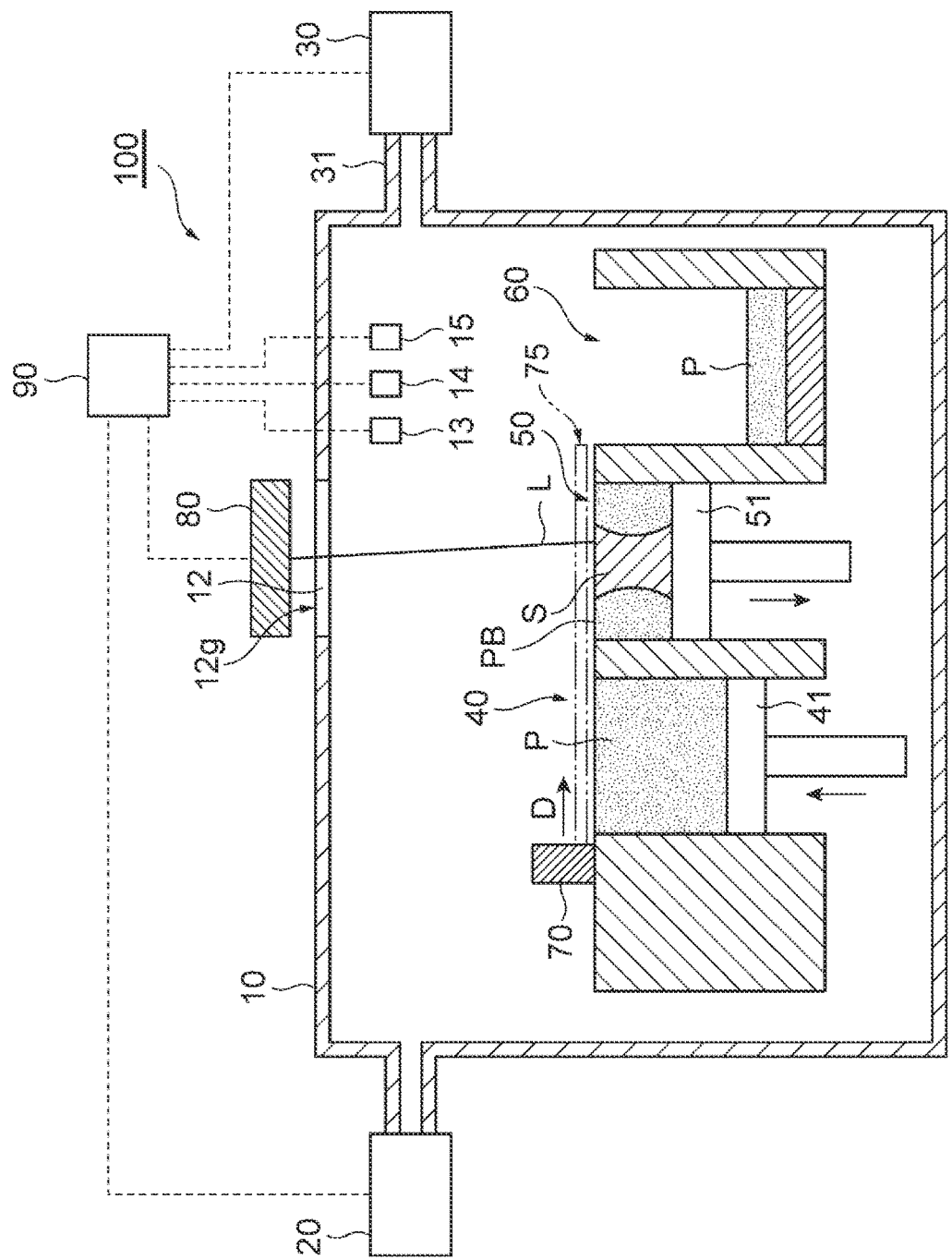
FIG. 2 is a schematic cross-sectional view of an example of an additive manufacturing apparatus for carrying out the additive manufacturing method of FIG. 1.

FIG. 1 is a flowchart showing an embodiment of the additive manufacturing method of the present disclosure. FIG. 2 is a schematic cross-sectional view of an example of an additive manufacturing apparatus 100 for carrying out the additive manufacturing method M of FIG. 1. As shown in FIG. 1, the additive manufacturing method M of this embodiment includes, for example, a shaping preparation step P1 and an additive manufacturing step P2, and can be carried out by the additive manufacturing apparatus 100 shown in FIG. 2. Hereinafter, an example of a configuration of the additive manufacturing apparatus 100 will first be described, and then the additive manufacturing method M of this embodiment using the additive manufacturing apparatus 100 will be described.

(Additive Manufacturing Apparatus)

The additive manufacturing apparatus 100 includes, for example, a chamber 10, a gas supply unit 20, a pumping-down mechanism 30, a material supply unit 40, an additive manufacturing unit 50, a recovery unit 60, a recoater 70, a beam source 80, and a control unit 90.

The chamber 10 houses, for example, units making up the additive manufacturing apparatus 100, except the beam source 80 and the pumping-down mechanism 30. The chamber 10 has, for example, a transmission window 12 in which a protective glass 12g is fitted. The transmission window 12 transmits a laser beam L emitted from the beam source 80 disposed outside the chamber 10, and allows the laser beam L to reach a powder bed PB placed on a stage 51 of the additive manufacturing unit 50 inside the chamber 10.

The chamber 10 is, for example, a vacuum chamber, which is pumped down by the pumping-down mechanism 30 to create a depressurized environment in the chamber where an internal pressure is lower than the atmospheric pressure. Inside the chamber 10, for example, a temperature sensor 13, a pressure sensor 14, an oxygen sensor 15, and the like are disposed. The temperature sensor 13, which is shown in a simplified form in FIG. 2, includes, for example, a contact type temperature sensor, such as a thermocouple, that measures the temperature of the stage 51, and a non-contact type temperature sensor, such as an infrared radiation thermometer, that measures the temperature of the powder bed PB formed on the stage 51. The pressure sensor 14 and the oxygen sensor 15 measure a pressure and an oxygen amount (oxygen concentration) in the depressurized environment of the chamber 10, respectively. The chamber 10 may include, for example, a camera (not illustrated) that photographs the powder bed PB formed on the stage 51 of the additive manufacturing unit 50.

The gas supply unit 20 is connected to the chamber 10, and supplies an inert gas into the chamber 10. The gas supply unit 20 includes, for example, a gas supply source and a control valve (not illustrated). The gas supply source is configured by a high-pressure tank filled with the inert gas. The control valve is controlled by the control unit 90, and controls the flow rate of the inert gas supplied from the gas supply source to the chamber 10. As the inert gas, for example, a nitrogen gas or an argon gas can be used.

The pumping-down mechanism 30 includes, for example, a vacuum pump, and is connected to the chamber 10 via a pipe 31 for vacuumizing. The pumping-down mechanism 30 is controlled, for example, by the control unit 90, and evacuates the chamber 10 of a gas to reduce the internal pressure of the chamber 10 to a vacuum pressure lower than the atmospheric pressure, thus creating a depressurized environment in the chamber 10.

The material supply unit 40 is formed into, for example, a recessed shape capable of holding material powder P, and has an open top where an opening is formed on an upper end. The material supply unit 40 includes a stage 41 that bears and supplies the material powder P and that can move vertically. The stage 41 makes up a bottom wall of the material supply unit 40. The stage 41 is configured such that it can be moved up and down at a prescribed pitch by, for example, an appropriate elevating mechanism. The elevating mechanism of the stage 41 is connected to, for example, the control unit 90 and is controlled by the control unit 90. The material supply unit 40 may supply the material powder P not by causing the stage 41 to move up and down but by dropping the material powder P.

The material powder P used for additive manufacturing of a shaped object S is not limited to a specific powder. For example, a powder of such a metal material as hot working tool steel, copper, titanium alloy, nickel alloy, aluminum alloy, cobalt chromium alloy, or stainless steel, a powder of such a resin material as polyamide, a powder of ceramics, or the like can be used as the material powder P. The additive manufacturing apparatus 100 of this embodiment can use, for example, a powder of a metal material with an average particle diameter of about 30 μm and a particle diameter range of about 15 μm to about 45 μm, as the material powder P.

Similar to the above-described material supply unit 40, the additive manufacturing unit 50 is formed into, for example, a recessed shape capable of holding the material powder P, and has an open top where an opening is formed on an upper end. The additive manufacturing unit 50 includes the stage 51 on which the material powder P is spread to form the powder bed PB. The stage 51 makes up a bottom wall of the additive manufacturing unit 50. The material powder P supplied from the material supply unit 40 and the shaped object S manufactured by additive manufacturing are placed on the stage 51.

The opening of the additive manufacturing unit 50 and the opening of the material supply unit 40 are roughly equal in vertical height, and are roughly juxtaposed in the horizontal direction. Similarly to the above-described material supply stage 41, the stage 51 for additive manufacturing is configured such that it can be moved up and down at a prescribed pitch by, for example, an appropriate elevating mechanism. The stage 51 is provided with, for example, a preheating mechanism including a heater that preheats the stage 51. The elevating mechanism and the preheating mechanism of the stage 51 are connected to, for example, the control unit 90 and are controlled by the control unit 90.

Similarly to the above-described material supply unit 40, the recovery unit 60 is formed into, for example, a recessed shape capable of holding the material powder P, and has an open top where an opening is formed on an upper end. In the example shown in FIG. 2, a bottom wall of the recovery unit 60 is fixed to its lower end. The bottom wall, however, may be provided as a stage capable of moving up and down, as in the cases of the material supply unit 40 and the additive manufacturing unit 50. The opening of the recovery unit 60 and the opening of the additive manufacturing unit 50 are roughly equal in vertical height, and are roughly juxtaposed in the horizontal direction. The recovery unit 60 recovers and stores, for example, an extra portion of the material powder P supplied from the material supply unit 40 to the additive manufacturing unit 50 by the recoater 70.

The recoater 70 carries the material powder P supplied from the material supply unit 40, to the stage 51 of the additive manufacturing unit 50 and spreads the material powder P all over the stage 51, thus forming the powder bed PB on the stage 51. The recoater 70 is provided with, for example, a moving mechanism 75. The moving mechanism 75 is, for example, a linear motor, and moves the recoater 70 along a roughly horizontal traveling direction D of heading from the material supply unit 40 toward the additive manufacturing unit 50.

As the beam source 80, for example, a laser light source that generates the laser beam L with power output ranging from several W to several kW can be used. The beam source 80 of the additive manufacturing apparatus 100 of this embodiment is, for example, a laser light source that generates a single-mode fiber laser having a wavelength of 1080 nm and power output of 500 W, that is, a laser whose energy intensity distribution matches the Gaussian distribution. The beam source 80 includes, for example, a galvanometer scanner that scans the powder bed PB with the laser beam L.

The control unit 90 is configured by, for example, a microcontroller and firmware. The control unit 90 includes, for example, a processor, such as a CPU, storage devices, such as a RAM and a ROM, programs and data that are stored in the storage devices, and an input/output unit that exchanges signals with each unit of the additive manufacturing apparatus 100. The control unit 90 causes the processor to execute programs stored in the storage devices, thereby controlling the gas supply unit 20, the pumping-down mechanism 30, the material supply unit 40, the additive manufacturing unit 50, and the beam source 80. In addition, detection results from the temperature sensor 13, the pressure sensor 14, and the oxygen sensor 15, output from a camera, and the like are inputted to the control unit 90.

(Additive Manufacturing Method)

An additive manufacturing method M of this embodiment using the additive manufacturing apparatus 100 will then be described. As shown in FIG. 1, the additive manufacturing method M of this embodiment includes, for example, the shaping preparation step P1 and an additive manufacturing step P2.

Figure 3:
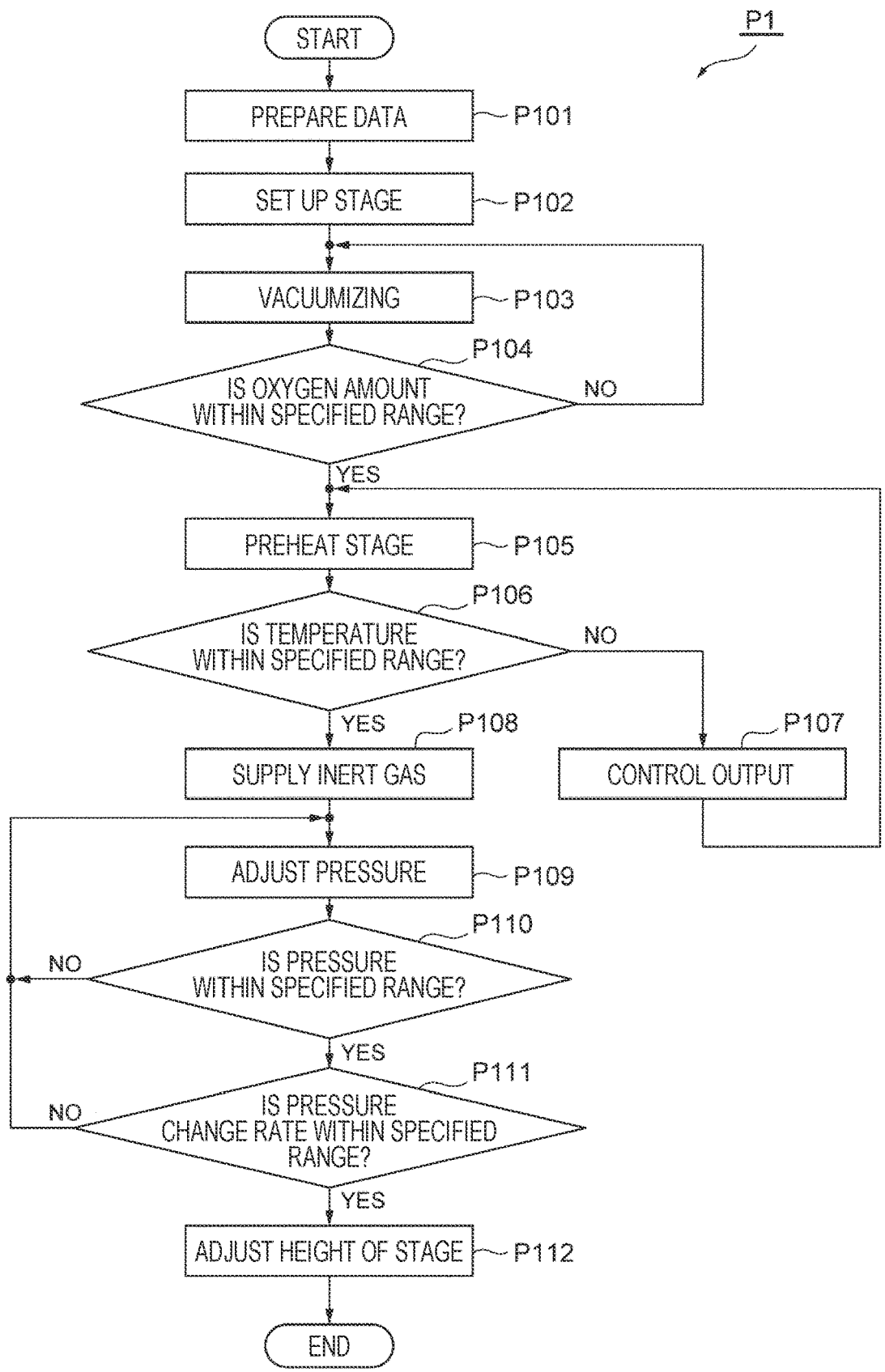
FIG. 3 is a flowchart showing details of a shaping preparation step of FIG. 1.
Figure 4:
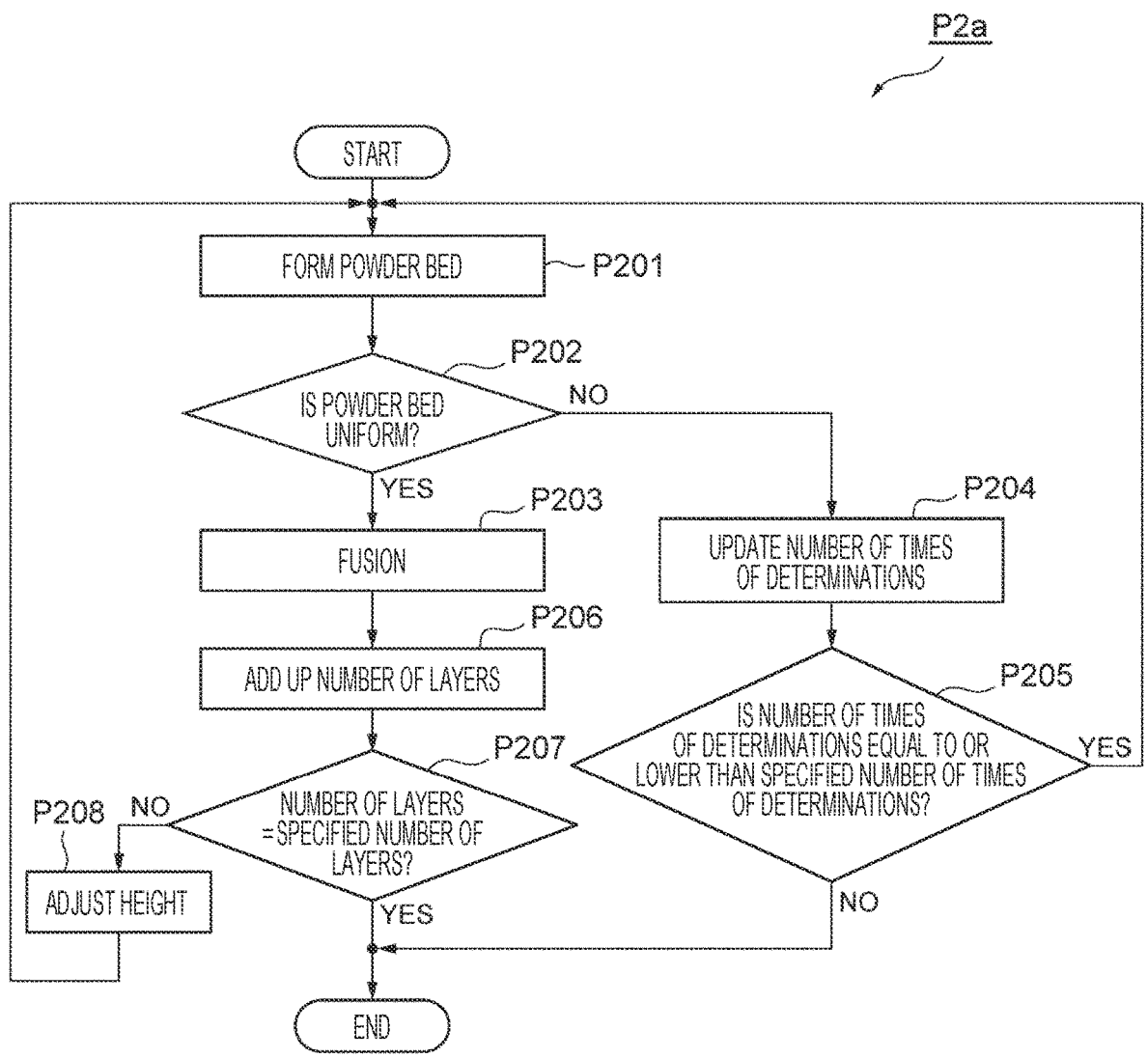
FIG. 4 is a flowchart of an additive manufacturing process included in an additive manufacturing step of FIG. 1.

FIG. 3 is a flowchart showing details of the shaping preparation step P1 of FIG. 1. In the shaping preparation step P1, a designer or an engineer carries out P101: data preparation. In P101: data preparation, for example, various parameters for manufacturing the shaped object S based on three-dimensional data are calculated from three-dimensional data, such as 3D-CAD data on the shaped object S to be manufactured by the additive manufacturing method M, using a dedicated editing device.

In addition, in this P101: data preparation, the dedicated editing device generates slice data on the shaped object S, based on the three-dimensional data. Further, the editing device is connected to the storage unit of the control unit 90 to store a calculated laser exposure trajectory in the storage device. The control unit 90 calculates a controlled variable for operating the gas supply unit 20, the pumping-down mechanism 30, the material supply unit 40, the additive manufacturing unit 50, the recoater 70, the beam source 80, and the like, based on, for example, the generated slice data. When the above processes are over, P101: data preparation ends.

Subsequently, the engineer executes P102: setting up the stage 51. Specifically, the top surface of the stage 51 is matched to the level of a shaping surface of the additive manufacturing unit 50 to create a state in which the material powder P can be spread on the additive manufacturing unit 50. Thereafter, the additive manufacturing apparatus 100 under control by the control unit 90 carries out processes according to an operation sequence.

The control unit 90 executes P103: vacuumizing the chamber 10. Specifically, for example, the control unit 90 causes the pumping-down mechanism 30 to evacuate the chamber 10 of a gas to reduce its internal pressure to a vacuum pressure lower than the atmospheric pressure, thus creating a depressurized environment in the chamber 10.

While executing P103: vacuumizing, for example, the control unit 90 executes P104: making a determination on an oxygen amount, i.e., oxygen concentration at the same time. In P104, the control unit 90 determines whether an oxygen amount is within a specified range, based on detection results from the oxygen sensor 15. The specified range of the oxygen concentration in the depressurized environment is set to, for example, 20 [ppm] or lower, 10 [ppm] or lower, or 0.3 [ppm] or lower, and is stored in the storage unit of the control unit 90.

When determining in P104 that the oxygen amount is outside the specified range (NO), the control unit 90 continues P103: vacuumizing the chamber 10, and repeatedly executes P104 until determining that the oxygen amount is within the specified range (YES). When determining in P104 that the oxygen amount is within the specified range (YES), the control unit 90 executes P105: preheating the stage 51.

In P105: preheating the stage 51, the control unit 90 controls, for example, a preheating mechanism of the stage 51 to preheat the stage 51. While executing P105: preheating the stage 51, for example, the control unit 90 executes P106: making a determination on the temperature of the stage 51 at the same time. In P106: making a determination on the temperature, the control unit 90 determines whether the preheating temperature of the stage 51 is within a specified range, based on detection results from the temperature sensor 13. The specified range of the preheating temperature of the stage 51 is set to, for example, 90 [° C.] or higher and 110 [° C.] or lower or 450 [° C.] or higher and 550 [° C.] or lower, and is stored in the storage unit of the control unit 90.

When determining in P106: making a determination on the temperature that the temperature of the stage 51 is outside the specified range (NO), the control unit 90 executes P107: controlling output from the preheating mechanism of the stage 51. In P106: making a determination on the temperature, the control unit 90 repeatedly executes P107: controlling output from the preheating mechanism of the stage 51 and P105: preheating the stage 51 until determining that the temperature of the stage 51 is within the specified range (YES).

When determining in P106: making a determination on the temperature of the stage 51 that the temperature of the stage 51 is within the specified range (YES), the control unit 90 starts P108: supplying an inert gas while continuing P105: preheating. The control unit 90 then executes P109: adjusting a pressure in the depressurized environment in the chamber 10, P110: making a determination on a pressure, and P111: making a determination on a pressure change rate.

Specifically, in P109: adjusting a pressure in the chamber 10, for example, the control unit 90 controls a degree of opening of a flow rate control valve of the gas supply unit 20 and output from the vacuum pump of the pumping-down mechanism 30. The control unit 90 thus adjusts an amount of supply of the inert gas into the chamber 10 and an amount of evacuation of a gas from the chamber 10 to adjust a pressure in the depressurized environment in the chamber 10. It should be noted that as the inert gas supplied by the gas supply unit 20, for example, a nitrogen gas, an argon gas, or the like can be used and that the amount of supply of the inert gas can be set to, for example, about 15 [l/min].

In P110: making a determination on a pressure, the control unit 90 determines whether the pressure in the depressurized environment in the chamber 10 is within a specified range stored in the storage unit, based on detection results from the pressure sensor 14. When determining in P110: making a determination on a pressure that the pressure in the depressurized environment in the chamber 10 is outside the specified range (NO), the control unit 90 repeats P109: adjusting a pressure in the chamber 10 and P110: making a determination on a pressure.

An appropriate range of the pressure in the depressurized environment varies, depending on, for example, the type of the inert gas and the preheating temperature of the stage 51. For this reason, the specified range of the pressure in the depressurized environment is set in accordance with, for example, the type of inert gas and the preheating temperature of the stage 51, and is stored in the storage unit of the control unit 90. The specified range of the pressure in the depressurized environment can be set to, for example, 8000 [Pa] or higher and 30000 [Pa] or lower in accordance with the type of inert gas and the preheating temperature of the stage 51.

More specifically, when the inert gas is a nitrogen gas, the specified range of the pressure in the depressurized environment can be set to, for example, 8000 [Pa] or higher and 30000 [Pa] or lower. When the inert gas is a nitrogen gas and the preheating temperature of the stage 51 is set to 200 [° C.] or higher and 650 [° C.] or lower, the pressure in the depressurized environment can be set to 12000 [Pa] or higher and 30,000 [Pa] or lower, more specifically, to 12000 [Pa] or higher and 14,000 [Pa] or lower.

When the inert gas is an argon gas, the specified range of the pressure in the depressurized environment can be set to, for example, 12000 [Pa] or higher and 30000 [Pa] or lower. When the inert gas is an argon gas and the preheating temperature of the powder bed PB is set to 200 [° C.] or higher and 650 [C] or lower, the pressure in the depressurized environment can be set to 20000 [Pa] or higher and 30000 [Pa] or lower.

When determining in P110: making a determination on a pressure that the pressure in the depressurized environment in the chamber 10 is within the specified range (YES), the control unit 90 executes P111: making a determination on a pressure change rate. A pressure change rate in the depressurized environment in the chamber 10 refers to, for example, a variation of the pressure in the depressurized environment that is measured within a specified time immediately before step P110. Specifically, in P111: making a determination on a pressure change rate, for example, the control unit 90 causes the storage device to store a pressure detected by the pressure sensor 14 over a given period, calculates a pressure variation in the given period, and compares the pressure variation with an upper limit to the variation stored in the storage device in advance. The given period can be set to, for example, 180 [s], and the upper limit to the variation can be set to, for example, 300 [Pa].

When determining in P111: making a determination on a pressure change rate that the pressure change rate in the depressurized environment is outside a specified range (NO), the control unit 90 repeats P109: adjusting a pressure in the depressurized environment, P110: making a determination on a pressure, and P111: making a determination on a pressure change rate. When determining in P111: making a determination on a pressure change rate that the pressure change rate in the depressurized environment is within the specified range (YES), the control unit 90 executes P112: adjusting the height of the stage 51.

In P112: adjusting the height of the stage 51, the control unit 90 controls the elevating mechanism of the stage 51 to lower the stage 51 to the same extent as an increment of the height of the stage 51 that results from thermal expansion of the preheated stage 51. The increment of the height of the stage 51 may be determined by calculation of the thermal expansion or may be detected by a non-contact position sensor or the like. When the above processes are over, the shaping preparation step P1 ends.

Subsequently, the control unit 90 starts the additive manufacturing step P2 shown in FIG. 1. FIGS. 4 to 7 are respective flowcharts of an additive manufacturing process P2a, a temperature monitoring process P2b, an oxygen amount monitoring process P2c, and a pressure monitoring process P2d that are included in the additive manufacturing step P2. For example, after starting the additive manufacturing step P2, the control unit 90 executes the additive manufacturing process P2a, the temperature monitoring process P2b, the oxygen amount monitoring process P2c, and the pressure monitoring process P2d at the same time as parallel processing.

Upon starting the additive manufacturing process P2a, the control unit 90 first executes P201: forming the powder bed PB. In P201: forming the powder bed PB, for example, the control unit 90 causes the stage 41 of the material supply unit 40 to move up to a given height. As a result, a given amount of the material powder P for additive manufacturing is pushed up to a point above the opening of the material supply unit 40. The control unit 90 then drives the moving mechanism 75 of the recoater 70 to move the recoater 70 forward in the traveling direction D such that the recoater 70 crosses the opening of the material supply unit 40 and the opening of the additive manufacturing unit 50.

As a result, the material powder P pushed up to the point above the opening of the material supply unit 40 is carried from the material supply unit 40 to the additive manufacturing unit 50 and is spread all over the stage 51 to form the powder bed PB. P201: forming the powder bed PB is thus completed. Subsequently, the control unit 90 executes P202: determining a state of the powder bed PB.

Figure 8:
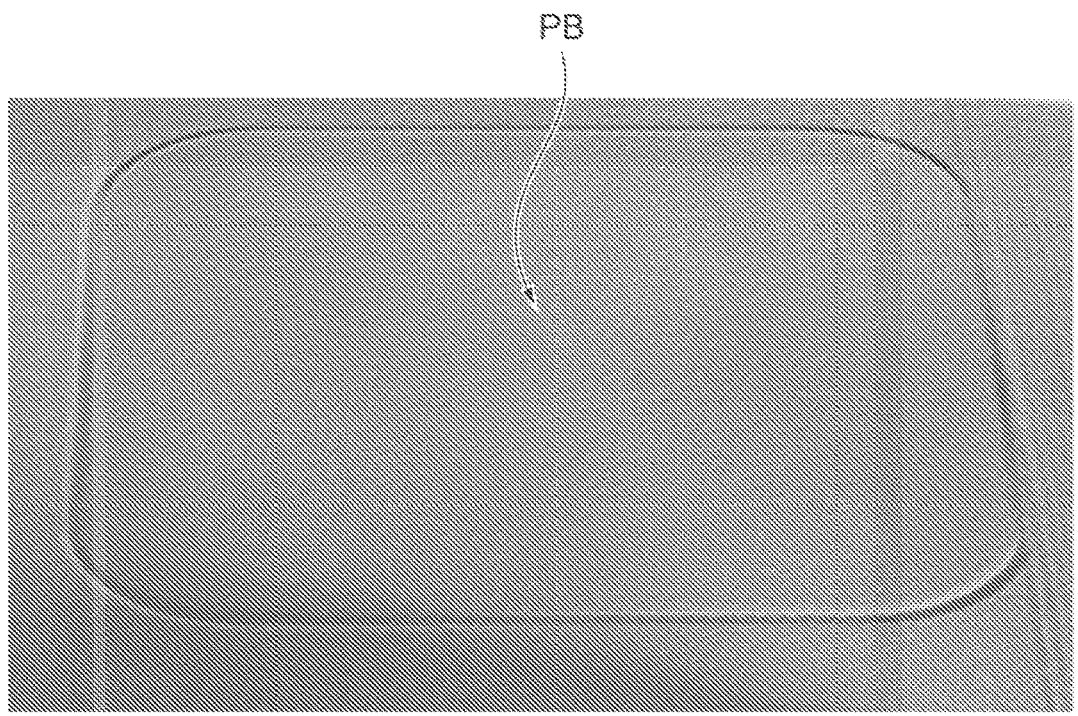
FIG. 8 is a photograph of a powder bed that is formed as a stage is preheated and an inert gas is supplied.

FIG. 8 is a photograph of an example of the powder bed PB that is formed on the stage 51 as the stage 51 is preheated and an inert gas is supplied in the depressurized chamber 10 in P201: forming the powder bed PB. In P202: determining a state of the powder bed PB, for example, the control unit 90 determines whether the powder bed PB is uniform, based on, for example, output from a camera that photographs the powder bed PB. For example, as shown in FIG. 8, when the powder bed PB is formed uniformly, the control unit 90 determines that powder bed PB is uniform (YES) and starts P203: fusion.

When an irregularity or a fracture is found in the powder bed PB or the stage 51 is partially exposed, however, the control unit 90 determines that the powder bed PB is not uniform (NO). In this case, the control unit 90 executes P204: updating the number of times of determinations and P205: making a determination on the number of times of determinations.

In P204: updating the number of times of determinations, the control unit 90 adds 1 to the number of times of execution of P202: determining a state of the powder bed PB, the number of times of execution being stored in the storage unit, to update the number of times of execution, thus overwriting the number of times of execution stored in the storage unit with the updated number of times of execution. In P205: determining whether the number of times of determinations is equal to or less than a specified number of times, the control unit 90 determines whether the number of times of determinations, that is, the number of times of execution of P202: determining a state of the powder bed PB, the number of times of execution being stored in the storage unit, is equal to or less than a specified number of times stored in the storage unit.

When determining in P205 that the number of times of determination is equal to or less than the specified number of times (YES), the control unit 90 repeats P201: forming the powder bed PB and P202: determining a state of the powder bed PB. When determining in P205 that the number of times of determination exceeds the specified number of times (NO), the control unit 90 ends the additive manufacturing process P2a and ends the additive manufacturing method M shown in FIG. 1.

P202: determining a state of the powder bed PB is not necessarily executed without fail. For example, P203: fusion may be started at a point of time of the end of P201: forming the powder bed PB, without executing P202: determining a state of the powder bed PB, that is, regardless of the state of the powder bed PB. In such a case, P204: updating the number of times of determinations and P205: making a determination on the number of times of determinations are not executed, too.

When determining in P202: determining a state of the powder bed PB that the powder bed PB is uniform (YES), the control unit 90 starts P203: fusion, in which case the control unit 90 controls the beam source 80 shown in FIG. 2, thus causing it to emit the laser beam L onto the powder bed PB to fuse the material powder P. At this time, the control unit 90 controls the galvanometer scanner of the beam source 80, based on a parameter and a controlled variable that are calculated in P101: data preparation of the shaping preparation step P1, thus causing the laser beam L to scan the powder bed PB by following a trajectory calculated from slice data on the shaped object S and shaping a target layer.

When completing a process of shaping one layer making up the shaped object S based on the slice data, the process being executed as P203: fusion, the control unit 90 executes P206: adding up the number of layers and P207: making a determination on the number of layers. In P206: adding up the number of layers, the control unit 90 adds 1 to the number of shaped layers of the shaped object S, the number of shaped layers being stored in the storage unit, thus overwriting the number of shaped layers in the storage unit. In P207: making a determination on the number of layers, the control unit 90 determines whether the number of shaped layers of the shaped object S, the number of shaped layers being stored in the storage unit, is equal to a specified number of layers that is the total number of layers of the shaped object S.

When determining in P207: making a determination on the number of layers that the number of shaped layers of the shaped object S is smaller than the specified number (NO), the control unit 90 executes P208: adjusting the height of the stage 51 and repeats a loop of steps ranging from P201: forming the powder bed PB to P207: making a determination on the number of layers. In P208: adjusting the height of the stage 51, the control unit 90 controls the elevating mechanism of the stage 51 to lower the stage 51, based on the height of the one layer making up the shaped object S based on the slice data.

When determining in P207: making a determination on the number of layers that the number of shaped layers of the shaped object S is equal to the specified number (YES), the control unit 90 ends the additive manufacturing process P2a and ends the additive manufacturing method M shown in FIG. 1.

Figure 5:
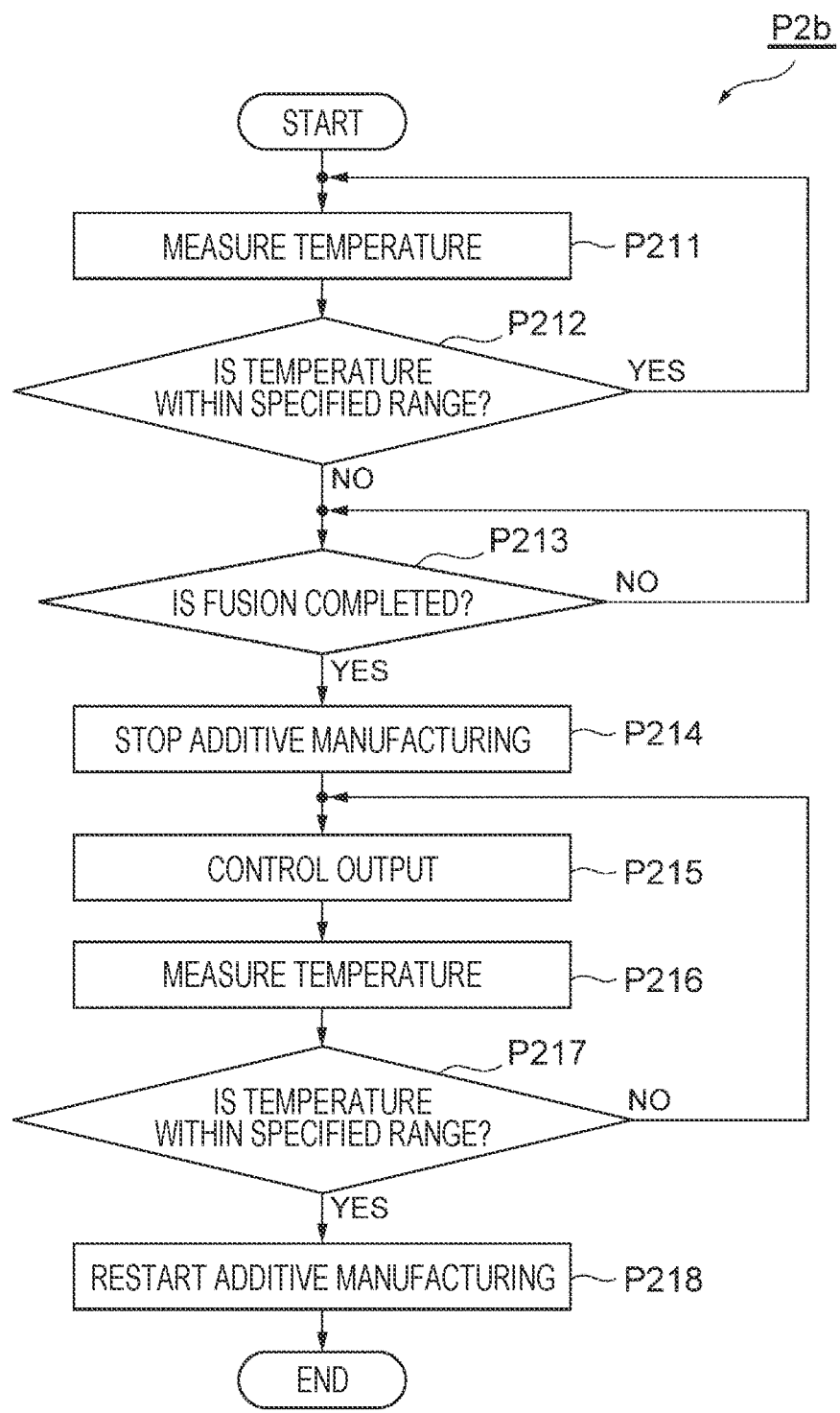
FIG. 5 is a flowchart of a temperature monitoring process included in the additive manufacturing step of FIG. 1.

While executing the above additive manufacturing process P2a, the control unit 90 executes the temperature monitoring process P2b shown in FIG. 5 at the same time. Upon starting the temperature monitoring process P2b, the control unit 90 first executes P211: measuring the temperature of the stage 51 and P212: making a determination on the temperature. In P211: measuring the temperature of the stage 51, the control unit 90 measures the temperature of the stage 51, based on detection results from the temperature sensor 13. In P212: making a determination on the temperature, the control unit 90 determines whether the temperature of the stage 51 measured in P211: measuring the temperature is within a specified temperature range stored in the storage unit.

When determining in P212 that the temperature of the stage 51 is within the specified temperature range (YES), the control unit 90 repeats P211: measuring the temperature of the stage 51 and P212: making a determination on the temperature until the additive manufacturing process P2a ends. When determining in P212 that the temperature of the stage 51 is outside the specified temperature range (NO), the control unit 90 executes P213: determining whether P203: fusion is completed.

When determining in P213: determining whether fusion is completed that P203: fusion of one layer making up the shaped object S is not completed (NO), the control unit 90 repeats P213: determining whether fusion is completed until P203: fusion of one layer making up the shaped object S is completed. When determining in P213: determining whether fusion is completed that P203: fusion of one layer is completed (YES), the control unit 90 executes P214: stopping the additive manufacturing process P2a, P215: adjusting output from the preheating mechanism of the stage 51, P216: measuring the temperature of the stage 51, and P217: making a determination on the temperature of the stage 51.

P215: adjusting output from the preheating mechanism of the stage 51, P216: measuring the temperature of the stage 51, and P217: making a determination on the temperature of the stage 51 can be executed in the same manner as execution of P107: controlling output from the preheating mechanism of the stage 51, P105: preheating the stage 51, and P106: making a determination on the temperature, P107, P105, and P106 being included in the shaping preparation step P1. When determining in P217: making a determination on the temperature of the stage 51 that the temperature of the stage 51 is outside the specified range (NO), the control unit 90 repeatedly executes P215: adjusting output from the preheating mechanism of the stage 51, P216: measuring the temperature of the stage 51, and P217: making a determination on the temperature of the stage 51.

When determining in P217: making a determination on the temperature of the stage 51 that the temperature of the stage 51 is within the specified range (YES), the control unit 90 executes P218: restarting the stopped additive manufacturing process P2a, and ends the temperature monitoring process P2b. The control unit 90, for example, repeatedly executes the temperature monitoring process P2b until the additive manufacturing process P2a comes to an end.

Figure 6:
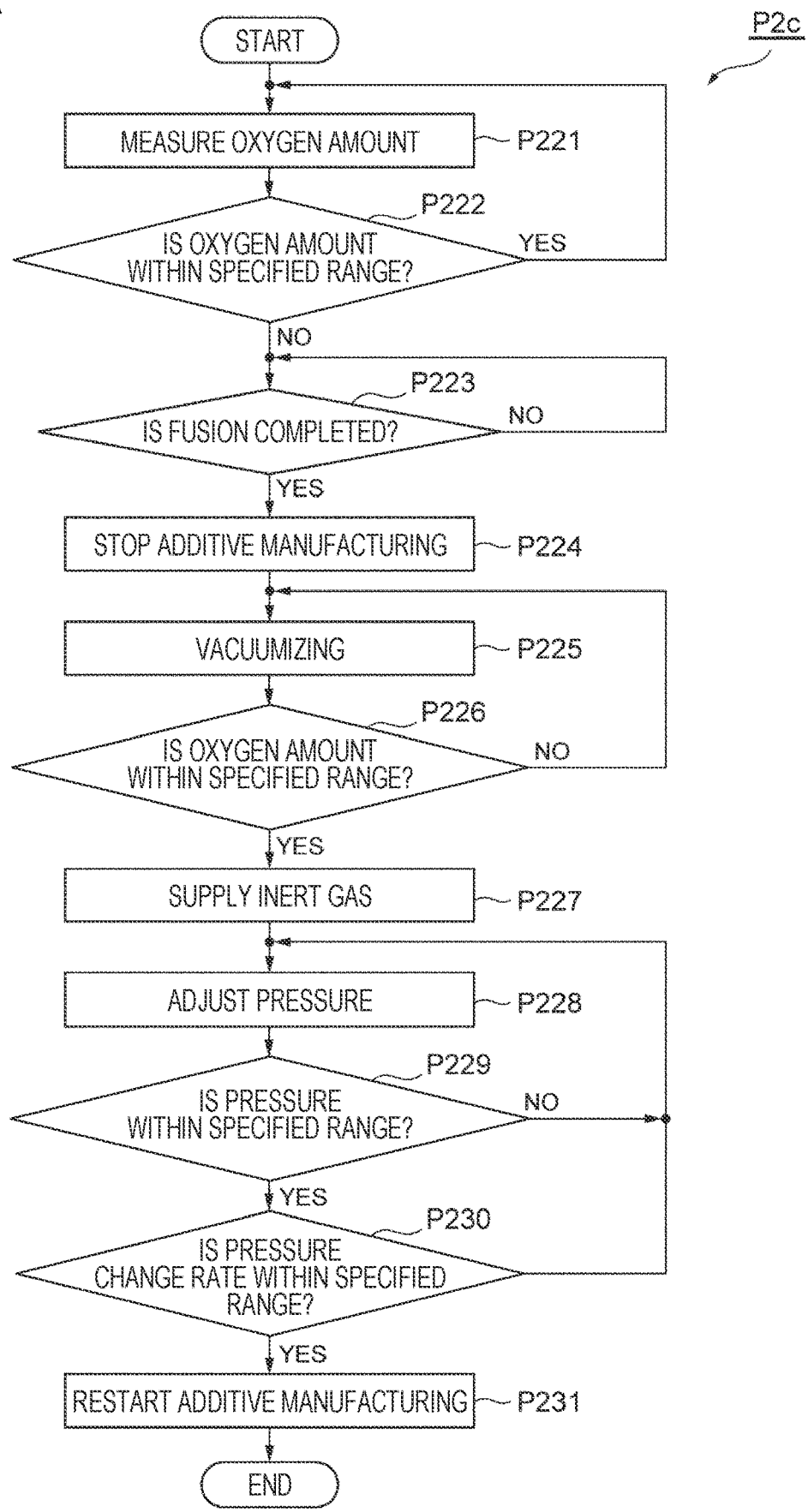
FIG. 6 is a flowchart of an oxygen amount monitoring process included in the additive manufacturing step of FIG. 1.

While executing the above additive manufacturing process P2a and temperature monitoring process P2b, the control unit 90 executes the oxygen amount monitoring process P2c shown in FIG. 6 at the same time. Upon starting the oxygen amount monitoring process P2c, the control unit 90 first executes P221: measuring an oxygen amount and P222: making a determination on an oxygen amount. In P221: measuring an oxygen amount, the control unit 90 measures an oxygen amount in the chamber 10, based on detection results from the oxygen sensor 15. In P222: making a determination on an oxygen amount, the control unit 90 determines whether an oxygen amount in the chamber 10, the oxygen amount being measured in P221: measuring an oxygen amount, is within a specified range stored in the storage unit.

When determining in P222: making a determination on an oxygen amount that the oxygen amount in the chamber 10 is within the specified range (YES), the control unit 90 repeats P221: measuring an oxygen amount and P222: making a determination on an oxygen amount until the additive manufacturing process P2a ends. When determining in P222: making a determination on an oxygen amount that the oxygen amount in the chamber 10 is outside the specified range (NO), the control unit 90 executes P223: determining whether P203: fusion is completed.

When determining in P223: determining whether P203: fusion is completed that P203: fusion of one layer making up the shaped object S is not completed (NO), the control unit 90 repeats P223: determining whether P203: fusion is completed until P203: fusion of one layer making up the shaped object S is completed. When determining in P223: determining whether P203: fusion is completed that P203: fusion of one layer is completed (YES), the control unit 90 executes P224: stopping the additive manufacturing process P2a, P225: vacuumizing the chamber 10, and P226: making a determination on an oxygen amount. P225: vacuumizing and P226: making a determination on an oxygen amount can be executed in the same manner as execution of P103: vacuumizing and P104: making a determination on an oxygen amount, respectively, P103 and P104 being included in the shaping preparation step P1.

When determining in P226: making a determination on an oxygen amount that an oxygen amount is within the specified range (YES), the control unit 90 executes P227: supplying an inert gas, P228: adjusting a pressure, P229: making a determination on a pressure, and P230: making a determination on a pressure change rate, P227, P228, P229, and P230 being included in the shaping preparation step P1. These steps can be executed in the same manner as execution of P108: supplying an inert gas, P109: adjusting a pressure, P110: making a determination on a pressure, and P111: making a determination on a pressure change rate, respectively, P108, P109, P110, and P111 being included in the shaping preparation step P1 described above.

When determining in P229: making a determination on a pressure and in P230: making a determination on a pressure change rate that a pressure in the chamber 10 and a rate of change of the pressure are within the specified ranges, respectively (YES), the control unit 90 executes P231: restarting the additive manufacturing process P2a. Following execution of the above steps, the oxygen amount monitoring process P2c comes to an end. The control unit 90 repeatedly executes the oxygen amount monitoring process P2c until the additive manufacturing process P2a ends.

Figure 7:
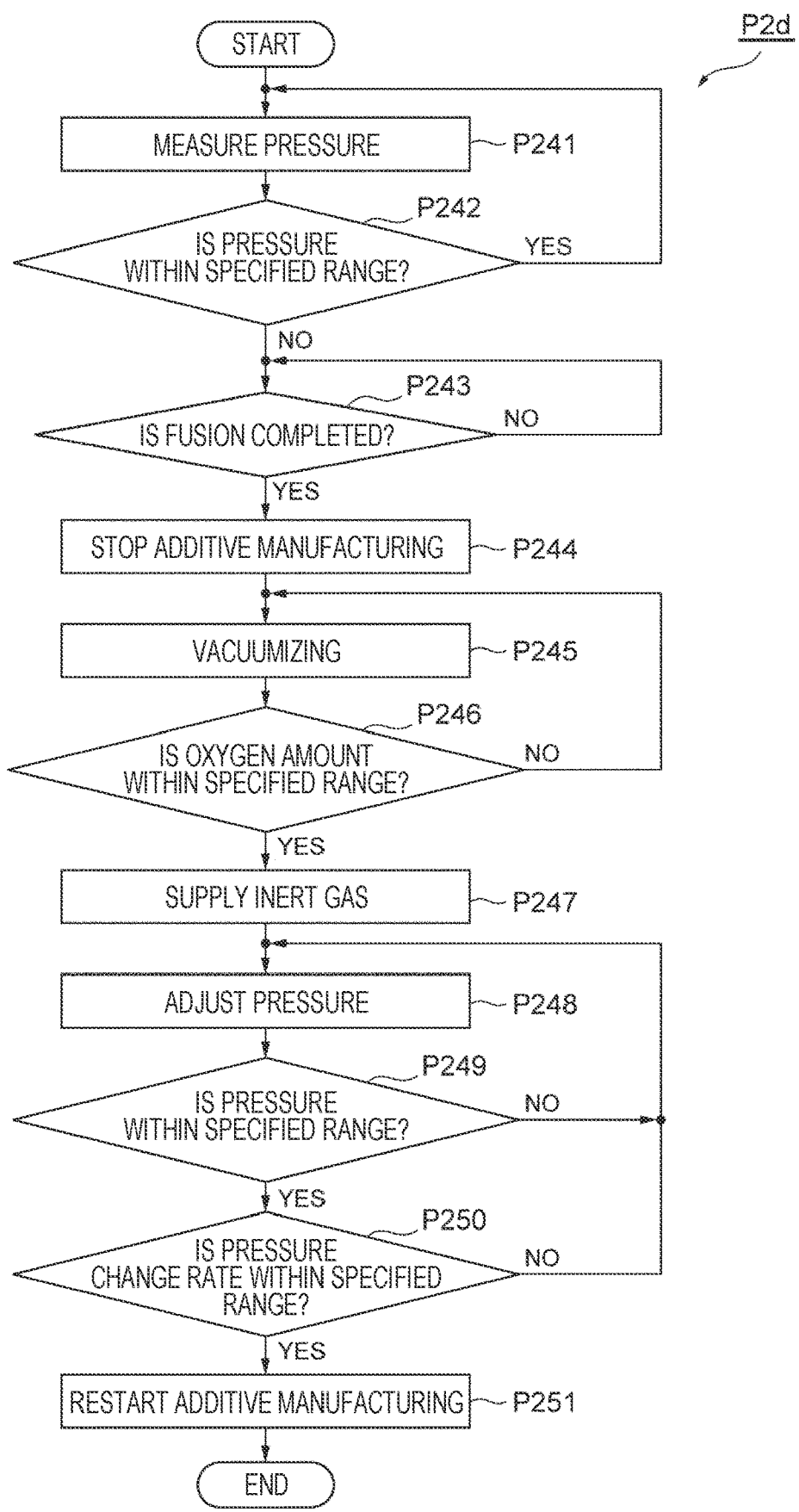
FIG. 7 is a flowchart of a pressure monitoring process included in the additive manufacturing step of FIG. 1.

While executing the above additive manufacturing process P2a, temperature monitoring process P2b, and oxygen amount monitoring process P2c, the control unit 90 executes the pressure monitoring process P2d shown in FIG. 7 at the same time. Upon starting the pressure monitoring process P2d, the control unit 90 first executes P241: measuring a pressure and P242: making a determination on a pressure. In P241: measuring a pressure, the control unit 90 measures a pressure in the chamber 10, based on detection results from the pressure sensor 14. In P242: making a determination on a pressure, the control unit 90 determines whether a pressure in the chamber 10 measured in P241: measuring a pressure is within the specified range stored in the storage unit.

When determining in P242: making a determination on a pressure that the pressure in the chamber 10 is within the specified range (YES), the control unit 90 repeats P241: measuring a pressure and P242: making a determination on a pressure until the additive manufacturing process P2a ends. When determining in P242: making a determination on a pressure that the pressure in the chamber 10 is outside the specified range (NO), the control unit 90 executes P243: determining whether P203: fusion of one layer making up the shaped object S is completed. P243: determining whether P203: fusion of one layer making up the shaped object S is completed can be executed in the same manner as execution of P213: determining whether fusion is completed in the temperature monitoring process P2b and of P223: determining whether fusion is completed in the oxygen amount monitoring process P2c.

In the pressure monitoring process P2d, steps following P243: determining whether P203: fusion of one layer making up the shaped object S is completed, that is, steps ranging from P224: stopping the additive manufacturing process P2a to P251: restarting the additive manufacturing process P2a can be executed in the same manner as execution of steps ranging from P244: stopping the additive manufacturing process P2a to P231: restarting the additive manufacturing process P2a in the oxygen amount monitoring process P2c. Following execution of the above steps, the pressure monitoring process P2d comes to an end. The control unit 90 repeatedly executes the pressure monitoring process P2d until the additive manufacturing process P2a ends.

Effects the additive manufacturing method M of this embodiment offers will hereinafter be described.

As described above, the additive manufacturing method M of this embodiment is the method of forming the powder bed PB on the stage 51 in the chamber 10 and emitting the laser beam L onto the powder bed PB to manufacture the shaped object S by fusion (P203). The additive manufacturing method M of this embodiment is characterized in that the pressure in the chamber 10 is reduced to a pressure equal to or higher than 8000 [Pa] and equal to or lower than 30,000 [Pa] and that the powder bed PB is formed on the stage 51 as the stage 51 is preheated and the inert gas is supplied.

In such a configuration, the amount of oxygen in the depressurized environment in the chamber 10, in which the shaped object S is shaped, is reduced sufficiently. As a result, an amount of oxygen taken into the shaped object S during additive manufacturing is reduced, which suppresses oxidization of materials in P201: forming the powder bed PB and in P203: fusion. Therefore, even if materials with high crack susceptibility, that is, materials with high hardness and low ductility are used for additive manufacturing of the shaped object S, these materials' becoming a brittle state or coming to have brittle characteristics is prevented, which makes it possible to manufacture the shaped object S while suppressing its cracking.

By carrying out the additive manufacturing process P2a of the shaped object S in the depressurized environment, heat released from the stage 51 into the environment can be reduced in P105: preheating the stage 51, which cuts down energy loss. By carrying out additive manufacturing of the shaped object S while supplying the inert gas, metal vapor generated in P203: fusion of the powder bed PB by its exposure to the laser beam L can be discharged from the depressurized environment, in which the shaped object S is shaped, by a flow of the inert gas. This improves the quality of the shaped object S.

Figure 9:
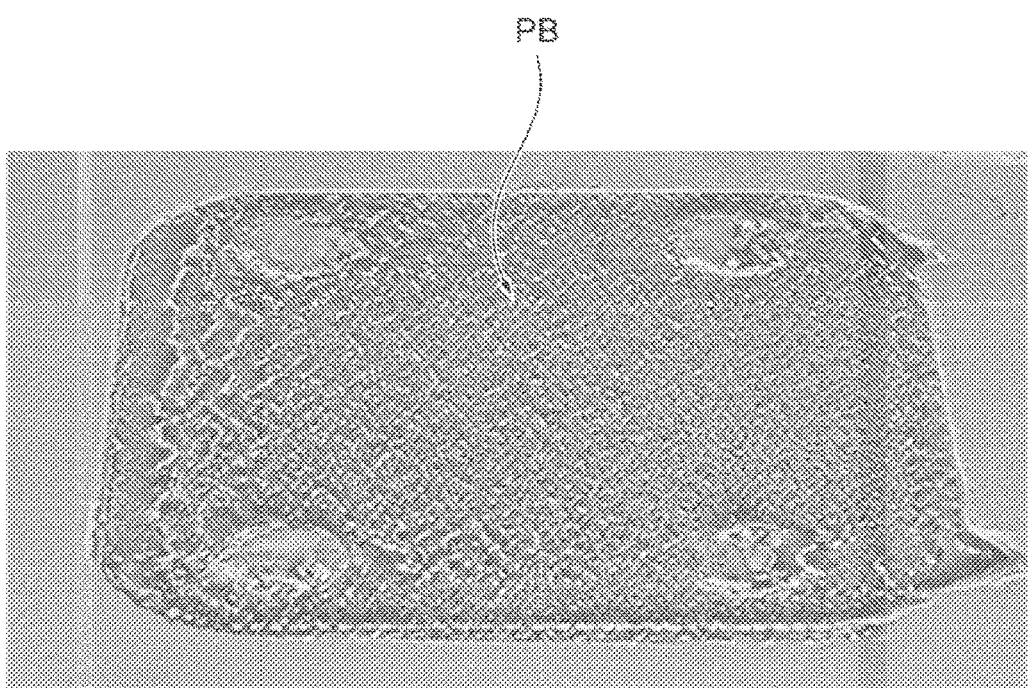
FIG. 9 is a photograph of the powder bed that is formed as the stage is preheated and the inert gas is supplied.
Figure 10:
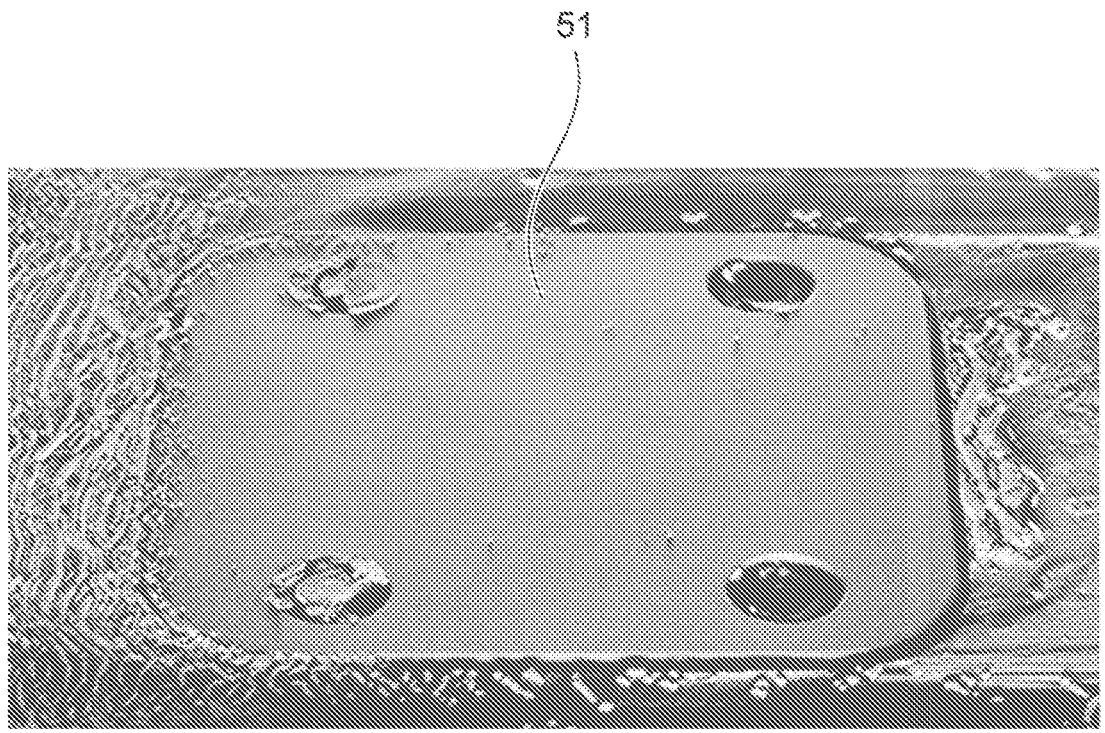
FIG. 10 is a photograph of the powder bed that is formed as the stage is preheated and the inert gas is supplied.

By keeping the pressure in the chamber 10 within the above specified range, when the interior of the chamber 10 is depressurized and the powder bed PB is formed on the stage 51 as the stage 51 is preheated (P105) and the inert gas is supplied, the uniform powder bed PB can be formed, as shown in FIG. 8. In contrast, when the pressure in the chamber 10 is reduced to a pressure outside the above specified range and the powder bed PB is formed on the stage 51 as the stage 51 is preheated (P105) and the inert gas is supplied, the uniform powder bed PB cannot be formed, as indicated in FIGS. 9 and 10. The reason why this happens is unclear. It is nevertheless suspected that, for example, the inert gas that expands in the vicinity of the stage 51 equipped with the heating mechanism to carry a high temperature has some effect on formation of the powder bed PB.

According to the additive manufacturing method M of this embodiment, by adopting a nitrogen gas as the inert gas supplied into the chamber 10, the powder bed PB can be formed in such a wide pressure range as described above. When a nitrogen gas is adopted as the inert gas, the pressure in the chamber 10 can be set to 12000 [Pa] or higher, and the preheating temperature of the stage 51 can be set to 200 [° C.] or higher and 650 [C] or lower. Hence, as shown in FIG. 8, the powder bed PB that is flat and uniform can be formed on the stage 51 when the interior of the chamber 10 is depressurized and the powder bed PB is formed as the stage 51 is preheated and the inert gas is supplied.

According to the additive manufacturing method M of this embodiment, by adopting an argon gas as the inert gas and setting the pressure in the depressurized environment to 12000 [Pa] or higher, forming the powder bed PB on the stage 51 while supplying the inert gas and preheating the stage 51 becomes possible. When an argon gas is adopted as the inert gas but the pressure in the chamber 10 is set lower than 12000 [Pa], however, forming the powder bed PB on the stage 51 while supplying the inert gas and preheating the stage 51 becomes difficult.

According to the additive manufacturing method M of this embodiment, it is preferable in the case of adopting an argon gas as the inert gas that the pressure in the chamber 10 be set to 20000 [Pa] or higher when the preheating temperature of the stage 51 is set to 200 [° C.] or higher and 650 [° C.] or lower. Hence, as shown in FIG. 8, the powder bed PB that is flat and uniform can be formed on the stage 51 when the interior of the chamber 10 is depressurized and the powder bed PB is formed as the stage 51 is preheated and the inert gas is supplied. In contrast, when an argon gas is adopted as the inert gas and the preheating temperature of the stage 51 is set to 200 [C] or higher and 650 [C] or lower but the pressure in the chamber 10 is set lower than 20000 [Pa], forming the powder bed PB that is flat and uniform becomes difficult in the case of forming the powder bed PB on the stage 51 while supplying the inert gas and preheating the stage 51, as indicated in FIG. 9.

The additive manufacturing method M of this embodiment includes the temperature monitoring process P2b by which the preheating temperature of the stage 51 is controlled to keep it in the specified temperature range during the additive manufacturing process P2a in which P201: forming the powder bed PB, preheating, and P203: fusion are repeated. In this manner, by controlling the preheating temperature of the stage 51, cracking of the shaped object S can be suppressed when such a material with high hardness and low ductility as described above is used.

The additive manufacturing method M of this embodiment includes also the pressure monitoring process P2d by which, when a pressure variation of 300 [Pa] or higher is measured in 180 [s] in the chamber 10 during the additive manufacturing process P2a in which P201: forming the powder bed PB, preheating, and P203: fusion are repeated, P245: vacuumizing the chamber 10 and adjustment of the oxygen amount and the pressure in the chamber 10 are executed after P203: fusion at measurement of the pressure variation is completed. In this manner, by controlling the change rate of the pressure in the depressurized environment to keep the change rate within the specified range, supply and discharge of the inert gas is stabilized, which can reduce a defect rate of the shaped object S. An increase in the pressure is caused by the effects of a gas component and metal vapor that are generated when the powder bed PB is fused by laser emission. A decrease in the pressure, on the other hand, arises when gas supply performance and gas discharge performance are unbalanced such that the gas discharge performance is higher. These factors lead to a pressure variation.

The additive manufacturing method M of this embodiment includes also the oxygen amount monitoring process P2c by which, when an oxygen amount equal to or larger than a specified value is measured in the chamber 10 during the additive manufacturing process P2a in which P201: forming the powder bed PB, preheating, and P203: fusion are repeated, P225: vacuumizing the chamber 10 and adjustment of the oxygen amount and the pressure in the chamber 10 are executed after P203: fusion executed immediately after measurement of the oxygen amount equal to or larger than the specified value is completed. In this manner, by controlling the oxygen amount in the depressurized environment to keep it equal to or smaller than the specified value, oxidization of the material can be effectively suppressed. Even when a material with high hardness and low ductility is used, therefore, the shaped object S can be manufactured as its cracking is suppressed.

As described above, according to this embodiment, even when the interior of the chamber 10 is depressurized and the powder bed PB is formed on the stage 51 as the stage 51 is preheated and the inert gas is supplied, the uniform powder bed PB can be formed, and the additive manufacturing method M that allows stable P203: fusion can be provided.

The embodiment of the additive manufacturing method according to the present disclosure has been described in detail with reference to drawings. Specific configurations are not limited to configurations described in this embodiment, and design-related modifications and the like that do not depart from the substance of the present disclosure are included in the present disclosure.

A first example and a second example according to the additive manufacturing method of the present disclosure will hereinafter be described.

First Example

In the first example, powder of hot working tool steel (JIS SKD 61) is used as the material powder P, and. the shaped object S is manufactured by the additive manufacturing method M including the shaping preparation step P1 and the additive manufacturing step P2, which have been described in the above embodiment. The specified range of the oxygen amount in P222: making a determination on an oxygen amount in the oxygen amount monitoring process P2c is set to 0.3 [ppm] or lower. The range of the preheating temperature of the stage 51 in P106: making a determination on the temperature in the shaping preparation step P1 and in P212: making a determination on the temperature in the temperature monitoring process P2b is set to a range of 450 [° C.] or higher and 550 [° C.] or lower. A nitrogen gas is used as the inert gas, an amount of supply of the inert gas is set to 15 [l/min], and the pressure in the chamber 10 is controlled to be kept at 12000 [Pa] or higher and 14000 [Pa] or lower.

Figure 11:
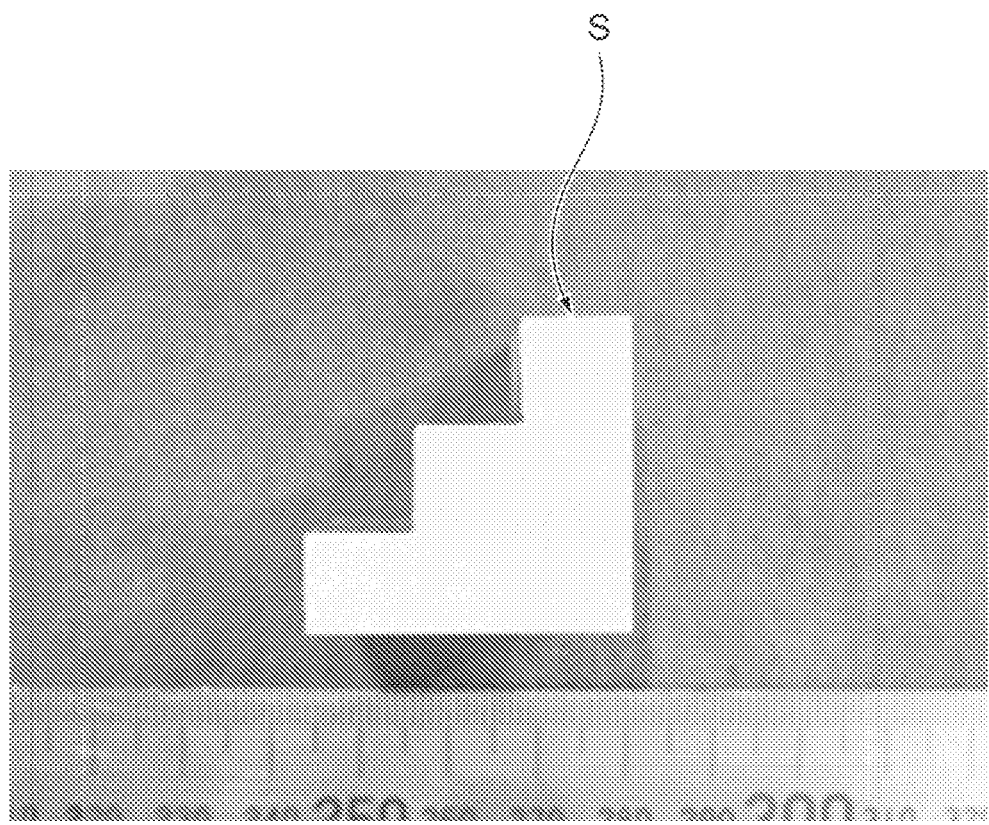
FIG. 11 is a photograph showing a result of penetrant testing of a shaped object manufactured by an additive manufacturing method of a first example.
Figure 12:
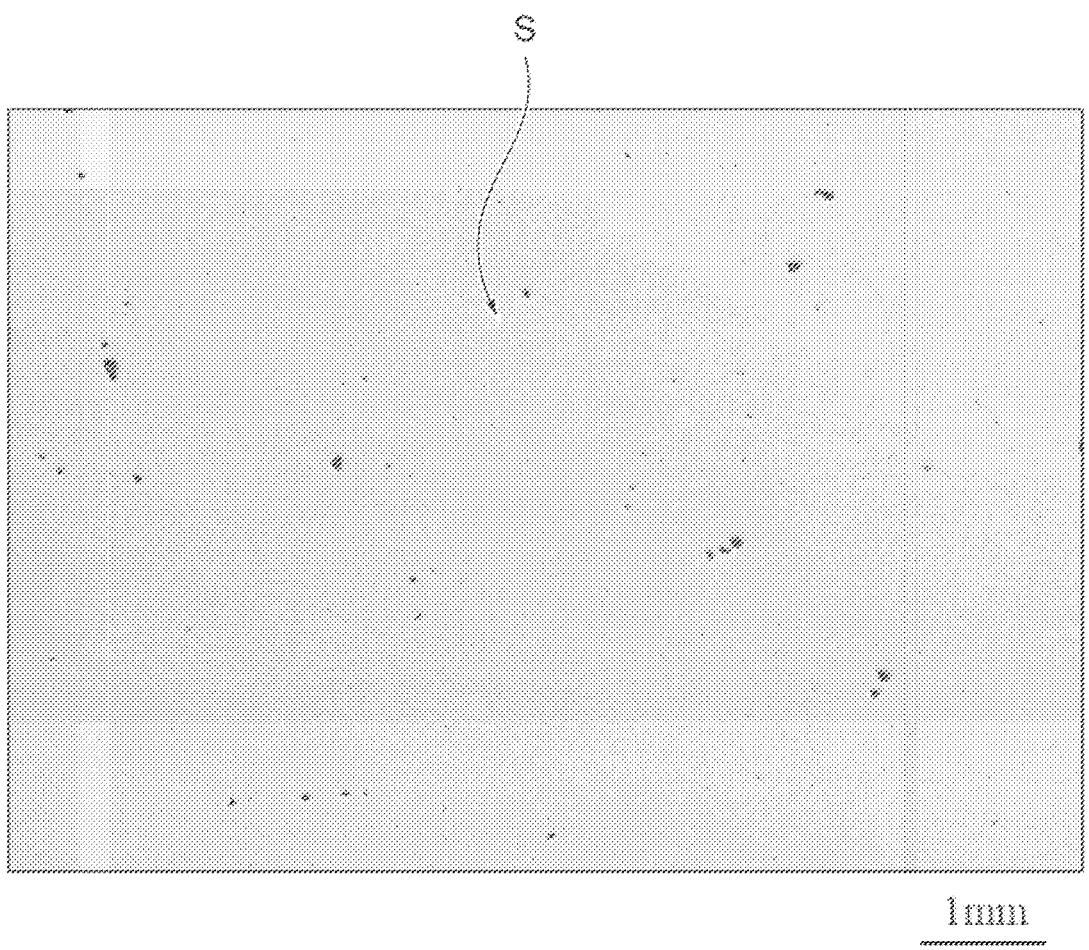
FIG. 12 is a photograph of an enlarged cross section of the shaped object manufactured by the additive manufacturing method of the first example.

FIG. 11 is a photograph showing a result of penetrant testing of the shaped object S according to the first example. FIG. 12 is a photograph of an enlarged cross section of the shaped object S according to the first example. As a result of the penetrant testing, no crack has been confirmed on the shaped object S according to the first example.

Second Example

In the second example, powder of a nickel-base alloy (Alloy 718) is used as the material powder P, and the shaped object S is manufactured by the additive manufacturing method M including the shaping preparation step P1 and the additive manufacturing step P2, which have been described in the above embodiment. The specified range of the oxygen amount in P222: making a determination on an oxygen amount in the oxygen amount monitoring process P2c is set to 0.3 [ppm] or lower. The range of the preheating temperature of the stage 51 in P106: making a determination on the temperature in the shaping preparation step P1 and in P212: making a determination on the temperature in the temperature monitoring process P2b is set to a range of 60 [° C.] or higher and 80 [° C.] or lower. An argon gas is used as the inert gas, an amount of supply of the argon gas is set to 15 [l/min], and the pressure in the depressurized environment in the chamber is controlled to be kept at 12000 [Pa] or higher and 14000 [Pa] or lower. The material powder P made of nickel-base alloy that is used in the second example is a material that does not require preheating in additive manufacturing. By the additive manufacturing method of the second example, the oxygen amount in the depressurized environment has been reduced and, consequently, an amount of oxygen taken into the shaped object S has been reduced to about 90 [ppm].

REFERENCE SIGNS LIST 10 chamber
51 stage
L laser
M additive manufacturing method
P2a additive manufacturing process
P102 setting up stage
P105 preheating stage
P203 fusion
P215 controlling output (controlling preheating temperature)
P216 measuring temperature (controlling preheating temperature)
P217 making determination on temperature (controlling preheating temperature)
P225 vacuumizing (adjusting oxygen amount)
P226 making determination on oxygen amount (adjusting oxygen amount)
P228 adjusting pressure
P245 vacuumizing (adjusting oxygen amount)
P246 making determination on oxygen amount (adjusting oxygen amount)
P248 adjusting pressure
PB powder bed
S shaped object

The invention claimed is:

1. An additive manufacturing method of forming a powder bed on a stage in a chamber and emitting a laser beam onto the powder bed to manufacture a shaped object by fusion, the additive manufacturing method comprising:
reducing a pressure inside the chamber to a pressure equal to or higher than 8000 [Pa] and equal to or lower than 30,000 [Pa]; and
forming the powder bed on the stage while preheating the stage and supplying an inert gas,
wherein when a pressure variation of 300 [Pa] or higher is measured in 180 [s] in the chamber during additive manufacturing in which formation of the powder bed and the fusion are repeated, and vacuumizing of the chamber and adjustment of an oxygen amount and a pressure in the chamber are executed after the fusion at measurement of the pressure variation is completed.

2. The additive manufacturing method according to claim 1, wherein a nitrogen gas is used as the inert gas.

3. The additive manufacturing method according to claim 2, wherein
a pressure in the chamber is set to 12000 [Pa] or higher, and
a preheating temperature of the stage is set to 200 [° C.] or higher and 650 [° C.] or lower.

4. The additive manufacturing method according to claim 1, wherein
an argon gas is used as the inert gas, and
a pressure in the chamber is set to 12000 [Pa] or higher.

5. The additive manufacturing method according to claim 4, wherein
a pressure in the chamber is set to 20000 [Pa] or higher, and
a preheating temperature of the stage is set to 200 [° C.] or higher and 650 [C] or lower.

6. The additive manufacturing method according to claim 1, wherein the preheating temperature is controlled to keep the preheating temperature within a specified temperature range during additive manufacturing in which formation of the powder bed and the fusion are repeated.

7. The additive manufacturing method according to claim 1, wherein when an oxygen amount equal to or larger than a specified value is measured in the chamber during additive manufacturing in which formation of the powder bed and the fusion are repeated, vacuumizing of the chamber and adjustment of an oxygen amount and a pressure in the chamber are executed after the fusion executed immediately after measurement of the oxygen amount equal to or larger than the specified value is completed.

* * * * *